Patented Jan. 18, 1938

2,105,669

UNITED STATES PATENT OFFICE 2,105,669

PLASTIC WORKING

John Parsons, Bainbridge, N. Y., assignor to American Plastics Corporation, a corporation of New York No Drawing. Application June 22, 1935, Serial No. 27,867

9 Claims. (Cl. 18—47.5)

This invention relates to the art of plastic working and more particularly to an improved method for making articles such as button blanks and the like from extruded rods of casein, and to the articles formed thereby.

The usual method of making such articles out of casein is to extrude the slightly moistened material with or without a suitable amount of a coloring agent and/or other ingredients into continuous rods, which are cut off in suitable lengths, for example 40 inches, as they come from the extruding press. These rods are then placed on racks and allowed to cool. As soon as a sufficient quantity of rods accumulate in one rack, the racks and rods are at once immersed in a weak solution of formaldehyde to harden, toughen, and cure the rods. After complete penetration of the formaldehyde solution has been obtained, these rods are removed from the bath and dried. Rods produced in this manner may be satisfactorily machined at high speeds as in automatic blanking machines of the lathe type to produce button blanks and similar articles. These blanks may then be finished in any desirable and conventional way such as by polishing, drilling, sorting and carding. The chief difficulty with such a method is that a large proportion of these rods is converted into turnings and shavings or other waste material. This material having already been impregnated with formaldehyde is a total loss since in this denatured or preserved condition, it cannot be re-formed and re-extruded. This loss of material usually varies from 50% of the rod in making small size button blanks to 75% of the material in making large blanks, such percentages being by weight.

Attempts have been made to overcome this difficulty by machining the extruded rods into articles before they are cured with formaldehyde. The uncured button blanks have then been cured in formaldehyde, dried and finished, thus saving the shavings and turnings from the machining operation which in the uncured state may be worked into additional rods. These attempts, however, have only been partially successful since the buttons, blanks and the like produced thereby contain pinholes or small depressions formed by bubbles which spoil the appearance of the finished product. It is also very difficult to machine the articles from these uncured rods without producing a large number of imperfect blanks by reason of the fact that in the relatively high speed machining operations, the shavings and turnings have a tendency to adhere or weld to the blanks. These imperfect blanks must be discarded since it is a practical or commercial impossibility to remove such imperfections to produce satisfactory articles.

The principal object of my invention is to overcome these difficulties and to so prepare the rods that the shavings, turnings, and imperfect articles, if any, may be re-extruded and re-used, and to produce articles free from pinholes and other defects characteristic of the prior art.

Another object of this invention is to produce articles free from any adhering or welded particles of shavings or turnings produced by the machining operations.

A further object of my invention is to season uncured casein stock in the form of rods and the like to produce a dense structure suitable for high speed machining.

In my improved process the rods of casein are extruded and cut to the proper length in a known manner but instead of allowing the heated rods to cool naturally in the air, they are conditioned by a seasoning process. This seasoning consists of subjecting the rods to controlled conditions of temperature and humidity which impart to the rods a consistency and absence of porosity such that they may be machined in high speed lathes or in any other way to produce blanks free from porosity and without any burrs or turnings welded to any of the portions thereof. This seasoning may be accomplished by prolonged refrigeration under proper conditions of humidity, or by a cold water treatment, or preferably by both treatments.

I have found that the quality of uncured rods, both as regards porosity and machineability is decidedly improved by holding the rods at temperatures between about 40° F. and about 70° F. in an atmosphere having a relative humidity of from about 95% to about 50%. Particularly good results may be obtained by placing the rods in a room in which the temperature is about 46° F. and the relative humidity is about 85%, corresponding to readings of 46° F. on the dry bulb and 44° F. on the wet bulb. A relatively high humidity is preferred to prevent the rods from drying at the surfaces and developing cracks.

Objectionable pinholes and other defects in the blanks and finished articles may also be overcome by subjecting the extruded stock to cold water at a temperature below about 70° F., and preferably not in excess of 50° F.

I prefer, however, to treat the rods by a process including a combination of these two treatments which comprises cooling the rods with cold water and then storing them until ready for use under the controlled conditions of temperature and humidity mentioned above. This process insures an excellent product and may be carried out commercially at a relatively low cost. When employing a cold water treatment such as described, the rods should not remain in the water for an unduly long period of time because they absorb moisture and swell in volume to an extent rendering them unfit for the machining operation.

The time for storing the rods depends upon the size of the same. For example, small rods capable of making about 22 ligne buttons or button blanks should be subjected to controlled conditions for approximately 24 hours to obtain the best results, while large rods capable of making 55 ligne blanks should be held in the conditioning room for approximately 72 hours. Seasoning for longer periods of time is not harmful and in fact assures the production of fully seasoned or stabilized rods. These time limits are given only by way of example to show the variation in time of seasoning according to the size of the rods being treated. Due allowance should also be made for varying conditions of temperatures and relative humidity.

Rods, treated by my process, turn very well in the high speed machines and I am able to turn out button blanks 22 ligne at the rate of 130 per minute and to cut 55 ligne blanks at the rate of 70–90 blanks per minute with practically no imperfections.

My process is extremely valuable in that I am able to save material that has been heretofore considered waste and a total loss and which in ordinary practice amounts to from 50 to 75% of the raw material used. The turnings, imperfect blanks, and other refuse is simply collected, dried, ground, and re-worked into rods. At the same time commercially acceptable button blanks and other articles are produced free from pinholes and other imperfections.

Button blanks and the like which are produced according to my improved method may be cured by immersion in formaldehyde solution similar to the manner of curing extruded rods and according to known practice. These buttons may thereafter be dried, polished, drilled to provide holes for attaching to garments, and either sold in bulk or placed on cards for sale. In short, the button blanks may be finished in any desirable way.

In ordinary practice I have found it to be desirable, although not by any means necessary, to control the temperature and humidity of the room in which the rods are machined into blanks. The temperature is preferably maintained below about 70° F. and the humidity should be maintained relatively high. Satisfactory and commercially acceptable products, however, may be readily obtained without going to this trouble.

While my process has been particularly described as relating to the manufacture of buttons and button blanks my improved process of preparing and seasoning casein may be applied to the manufacture of other articles. Various other articles may be machined from the rods instead of button blanks, or the articles may be formed in any suitable way without using automatic high speed lathes. My improved treatment including seasoning may also be applied to casein in other shapes than rods where it is found desirable to produce articles free from pinholes and similar imperfections.

While the term casein has been employed in the claims, it is undersood that this does not refer to only chemically pure casein but to the casein which is employed in the art of plastic working, that is, with or without coloring agents and/or other ingredients.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

What I claim is:

1. The method of making articles out of casein, comprising preparing an extruded rod of uncured casein, cooling said rod to room temperature, seasoning said rod by refrigeration at a temperature substantially below room temperature under non-drying conditions, cutting said seasoned and uncured rod into articles of the desired shape, and curing the articles thus formed.

2. The method of making buttons comprising preparing an extruded rod of uncured casein, cooling said rod in cold water, seasoning said rod by refrigeration at a temperature substantially below room temperature under non-drying conditions, cutting said seasoned and uncured rod into button blanks, and treating said blanks to cure the same.

3. In the method of making articles out of casein, the steps of preparing an extruded rod of uncured casein and seasoning said rod by subjecting the same to controlled non-drying conditions of humidity and a temperature below room temperature for a sufficient length of time to render said rod non-porous and freely machineable at high speeds, the temperature during this last named step being maintained below about 70° F. but not substantially lower than about 40° F.

4. In the method of making articles out of casein, the steps of preparing an extruded rod of uncured casein, cooling said rod in cold water, and seasoning said rod by subjecting the same to controlled non-drying conditions of humidity and a temperature below room temperature for a sufficient length of time to render said rod non-porous and freely machineable at high speeds, said temperature being maintained below about 70° F. but not substantially lower than about 40° F.

5. In the method of making articles out of casein, the steps of preparing an extruded rod of uncured casein, cooling said rod, and seasoning said rod by subjecting the same to controlled conditions of humidity and temperature for a sufficient length of time to render said rod non-porous and freely machineable at high speeds, said temperature being maintained between about 40° F. and about 70° F. and said humidity being maintained between about 95% and about 50% in terms of relative humidity.

6. In the method of making articles out of casein, the steps of preparing extruded rods of uncured casein subjecting said rods to water not warmer than 50° F. for a sufficient length of time to substantially improve their machineability and promptly machining said rods into articles upon removal from the water.

7. In the method of making articles out of casein, the steps of preparing an extruded rod of uncured casein, cooling said rod in cold water, seasoning said rod by subjecting the same to controlled conditions of humidity and temperature for a sufficient length of time to render said rod non-porous and freely machineable at high speeds, said temperature being maintained between about 40° F. and about 70° F. and said humidity being maintained between about 95% and 50% in terms of relative humidity, machining said seasoned rod at high speeds into articles of the desired shape, curing said shaped articles and collecting the waste material from said machining operation for use in extruding other rods.

8. In the method of making articles out of casein, the steps of preparing an extruded rod of uncured casein, cooling said rod by immersing the same in water at a temperature below about 70° F., and seasoning said rod by subjecting the same to controlled conditions of humidity and temperature for a sufficient length of time to render said rod non-porous and freely machineable at high speeds, said temperature being maintained between about 40° F. and about 70° F. and said humidity being maintained between about 95% and about 50% in terms of relative humidity.

9. In the method of making articles out of casein, the steps of preparing an extruded rod of uncured casein, cooling said rod by immersing the same in water at a temperature below about 70° F., and seasoning said rod by subjecting the same to controlled conditions of humidity and temperature for a sufficient length of time to render said rod non-porous and freely machineable at high speeds, said temperature being maintained between about 40° F. and about 70° F. and said humidity being maintained between about 95% and 50% in terms of relative humidity, machining said seasoned rod at high speeds into articles of the desired shape, curing said shaped articles, and collecting the waste material from said machining operation for use in extruding other rods.

JOHN PARSONS.